US012801683B2

(12) United States Patent
Oetsch et al.

(10) Patent No.: US 12,801,683 B2
(45) Date of Patent: Nov. 17, 2026

(54) DEVICE AND METHOD FOR SOLVING AN ANSWER SET PROGRAMMING PROGRAM FOR SCHEDULING JOBS TO MACHINES

(71) Applicant: Robert Bosch GmbH, Stuttgart (DE)

(72) Inventors: Johannes Oetsch, Vienna (AT); Nysret Musliu, Vienna (AT); Peter Skocovsky, Vienna (AT); Thomas Eiter, Vienna (AT); Tobias Geibinger, Vienna (AT); Daria Stepanova, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 975 days.

(21) Appl. No.: 18/060,110

(22) Filed: Nov. 30, 2022

(65) Prior Publication Data

US 2023/0185871 A1 Jun. 15, 2023

(30) Foreign Application Priority Data

Dec. 10, 2021 (DE) ..................... 10 2021 214 153.6

(51) Int. Cl.

*G06F 17/11* (2006.01)
*G06F 9/48* (2006.01)
*G06N 5/04* (2023.01)

(52) U.S. Cl.

CPC ............ *G06F 17/11* (2013.01); *G06F 9/4881* (2013.01); *G06N 5/04* (2013.01)

(58) Field of Classification Search

CPC ......... G06F 9/4881; G06F 17/11; G06N 5/01; G06N 5/025; G06N 5/04

See application file for complete search history.

(56) References Cited

U.S. PATENT DOCUMENTS

2008/0178187 A1* 7/2008 Altshuler .............. G06F 9/5027 718/104

2010/0225954 A1* 9/2010 Balduccini ............ G06F 9/4881 358/1.15

(Continued)

FOREIGN PATENT DOCUMENTS

DE 102021204043 B3 2/2022

EP 2884432 A1 * 6/2015 ............... G06N 5/01

OTHER PUBLICATIONS

Gebser, Martin, et al. "Multi-shot ASP solving with clingo." Theory and Practice of Logic Programming 19.1 (2019): 27-82. (Year: 2019).*

(Continued)

*Primary Examiner* — Matthew D Sandifer
(74) *Attorney, Agent, or Firm* — NORTON ROSE FULBRIGHT US LLP

(57) ABSTRACT

A device and a method for solving an answer set programming program. The method includes receiving constant symbols and a set of rules for the constant symbols that comprises the constant symbols, wherein the answer set programming program is defined depending on the set of rules, determining a solution to the answer set programming program that comprises at least one of the constant symbols, determining a constraint depending on a cost for the solution, selecting in the solution at least one constant symbol, redetermining the solution as a result of an answer set programming program that is defined depending on the set of rules, and the constraint, wherein when solving the answer set programming program for redetermining the solution, the at least one constant symbol is treated as variable in the set of rules.

12 Claims, 2 Drawing Sheets

(56) References Cited

U.S. PATENT DOCUMENTS

| | | | | |
|---|---|---|---|---|
| 2012/0050787 | A1* | 3/2012 | Balduccini | G06F 3/126 358/1.15 |
| 2022/0358421 | A1* | 11/2022 | Oetsch | G06Q 10/04 |

OTHER PUBLICATIONS

Gebser, Martin, et al. "Clingo= ASP+ control: Preliminary report." arXiv preprint arXiv:1405.3694 (2014). (Year: 2014).*
"Lokale Suche" Wikipedia (2020). pp. 5-6; dowloaded from https://de.wikipedia.org/wiki/Lokale_Suche.
Brewka et al. "Answer Set Programming at a Glance," Communications of the ACM 54(12) (2011), pp. 93.
"ASP-Based Team Building at Gioia Tauro Seaport," Communications of the ACM 54(12) (2011), pp. 94-103.
Janhunen et al. "Clingo goes Linear Constraints over Reals and Integers," arXiv (2017) pp. 1-16.
Ei-Kholani and Gebser: "Job Shope Scheduling with Multi-shot ASP," taasp 2020: Workshop on Trends and Applications of Answer Set Programming, (2020), Austria, pp. 1-3.

* cited by examiner

DEVICE AND METHOD FOR SOLVING AN ANSWER SET PROGRAMMING PROGRAM FOR SCHEDULING JOBS TO MACHINES

CROSS REFERENCE

The present application claims the benefit under 35 U.S.C. § 119 of German Patent Application No. DE 10 2021 214 153.6 filed on Dec. 10, 2021, which is expressly incorporated herein by reference in its entirety.

FIELD

The present invention relates to a device and a method for solving an answer set programming program for scheduling jobs to machines.

BACKGROUND INFORMATION

Solvers may be used for finding a solution based on the answer set program. However solvers may fail to find a solution or a better solution may exist than the solution that is found by the solver.

SUMMARY

According to an example embodiment of the present invention, a method for solving an answer set programming program comprises providing constant symbols and a set of rules for the constant symbols that comprises the constant symbols, wherein the answer set programming program is defined depending on the set of rules, determining a solution to the answer set programming program that comprises at least one of the constant symbols, determining a constraint depending on a cost for the solution, selecting in the solution at least one constant symbol, redetermining the solution as a result of an answer set programming program that is defined depending on the set of rules, and the constraint, wherein when solving the answer set programming program for redetermining the solution, the at least one constant symbol is treated as variable in the set of rules. With this method, the solution is improved by a large neighborhood search. To execute the large neighborhood search, a part of the solution is destroyed and restored with the answer set programming program that has an additional restriction, i.e. the additional constraint that leads to an improvement of the solution.

In one example for the method according to the present invention, the set of rules comprises Boolean variables and the constraint comprises a difference that depends on integer variables, wherein the set of rules and the constraint define a non-monotonic logic, wherein redetermining the solution comprises a combinatorial search and optimization on the non-monotonic logic.

According to an example embodiment of the present invention, the method may be for scheduling jobs to machines and comprise receiving constant symbols that represent either a job or a machine and a set of rules for assigning the jobs to the machines in which the jobs and the machines are represented by their constant symbols, determining as solution a schedule in which each constant symbol that represents a job is assigned to one constant symbol that represents a machine, determining the constraint depending on a cost for processing the jobs according to the schedule, selecting in the schedule at least one constant symbol, redetermining the schedule as the result of the answer set programming program that is defined depending on the set of rules, and the constraint, wherein when solving the answer set programming program, the at least one constant symbol is treated as variable in the set of rules.

The method may comprise determining the cost depending on a time for executing the jobs according to the schedule.

The method may comprise determining the constraint to express that the cost for processing the jobs according to the redetermined schedule is less than the cost for processing the jobs according to the schedule.

The method may comprise selecting, in the solution, an amount or a percentage of the constant symbols. The amount or percentage defines the size of the neighborhood. Searching in a larger neighborhood may result in a longer time for reconstructing the solution than searching in a smaller neighborhood. Searching in the larger neighborhood may more likely result in an improvement of the solution than searching in the smaller neighborhood.

The method may comprise determining the amount or percentage depending on a size of the set of rules or depending on a time limit for finding the solution with answer set programming.

The method may comprise selecting, in the solution, all of the constant symbols or treating all constants symbols in the set of rules as variables, in particular in case redetermining the solution fails. This deals with functional dependencies that cannot otherwise be resolved.

The method may comprise iteratively redetermining the solution and outputting the latest redetermined solution when a time limit is expired. The time limit may be adjusted according to the problem type or size.

Preferably, redetermining the solution comprises aborting a search for the result of the answer set program when a time limit is expired, selecting at least one different constant symbol to be treated as variable and restarting the redetermining of the solution with the at least one different constant symbol being treated as variable in the set of rules.

According to an example embodiment fo the present invention, a device for solving an answer set programming program comprises at least one processor and at least one memory comprising instructions that, when executed by the at least one processor, cause the device to execute the method. This device finds the solution with answer set programming and large neighborhood search.

According to an example embodiment of the present invention, a computer program comprises computer readable instructions that, when executed by a computer, cause the computer to execute the method.

Further embodiments of the present invention are derivable from the following description and the figures.

DETAILED DESCRIPTION OF EXAMPLE EMBODIMENTS

Figure 1:
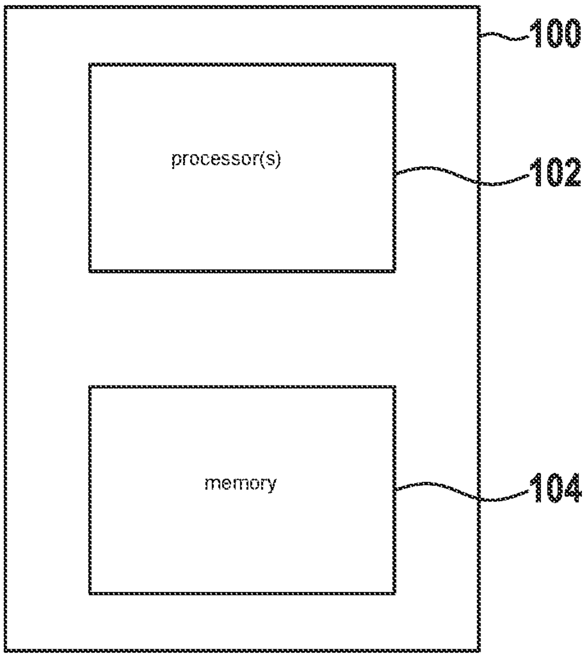
FIG. 1 schematically depicts a device for solving an answer set programming program, according to an example embodiment of the present invention.

FIG. 1 schematically depicts a device 100 for solving an answer set programming program.

Figure 2:
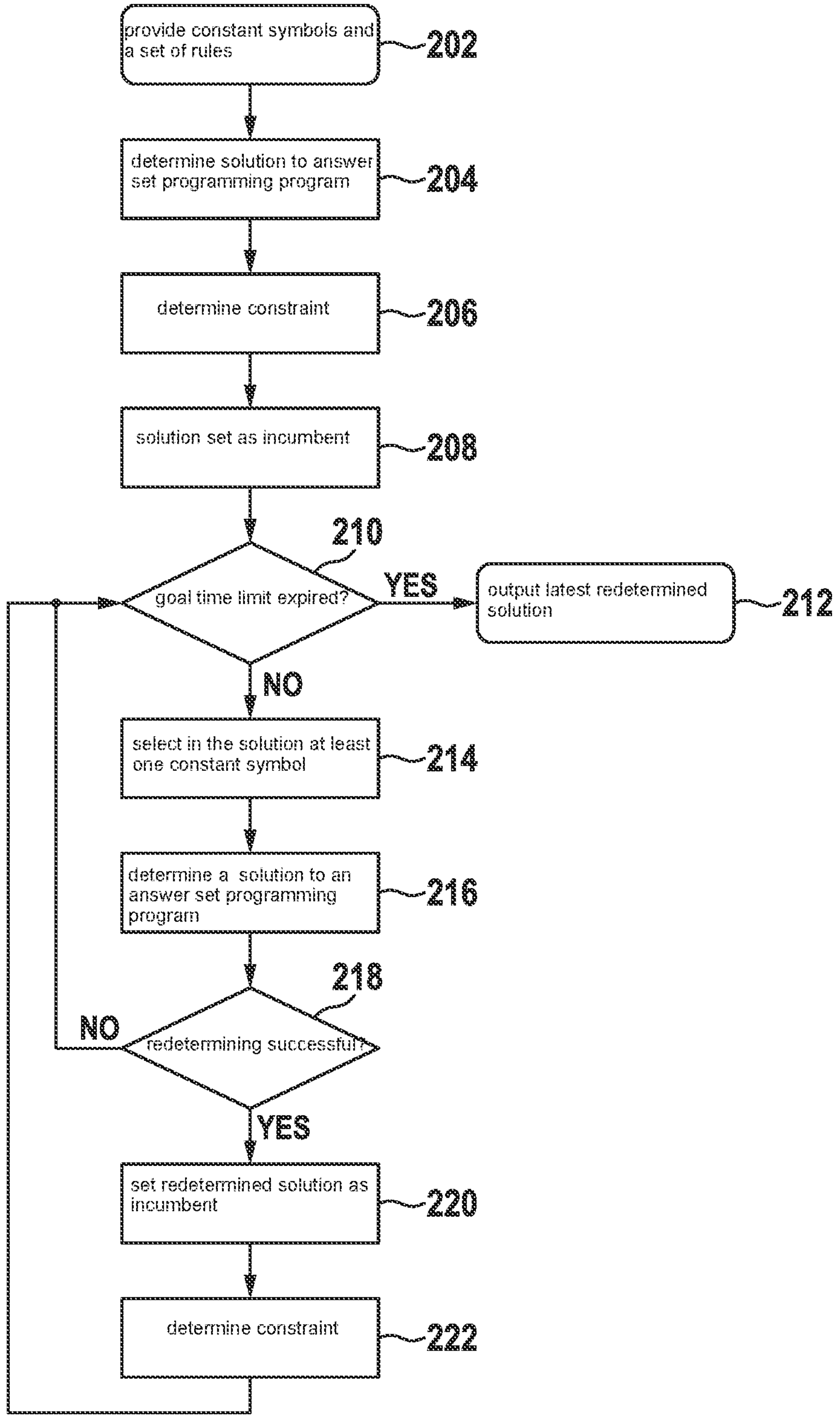
FIG. 2 depicts a flowchart of steps in a method for solving an answer set programming program, according to an example embodiment of the present invention.

The device 100 comprises at least one processor 102 and at least one memory 104 that comprising instructions that, when executed by the at least one processor, cause the device 100 to execute the method that is described below with reference to FIG. 2.

Answer set programming, ASP, is an approach for combinatorial search and optimization. A problem is specified using a respective modelling language and an ASP solver is subsequently used to search for solutions. The ASP that is used in the example is a hybrid ASP that supports, besides Boolean variables, also integer variables in the form of difference constraints in its modelling language.

ASP provides a declarative modelling language that allows one to succinctly represent search and optimization problems, for which solutions can be computed using dedicated hybrid ASP solvers.

A solver for the hybrid ASP is clingo-dl, Janhunen, T., Kaminski, R., Ostrowski, M., Schellhorn, S., Wanko, P., Schaub, T., "clingo goes Linear Constraints over Reals and Integers;" Theory and Practice of Logic Programming 17(5-6), 872-888 (2017).

The optimization capabilities of the hybrid ASP solver clingo-dl are improved with the method described herein. The particular problem that is solved in an example disclosed herein is a minimization of a single integer variable of a problem specification provided in the declarative modelling language.

In an example the hybrid ASP solver is used for solving a machine scheduling problem in which a cost for executing jobs on machines, i.e. a makespan, shall be small. In this example, the integer variable represents the cost.

The hybrid ASP solver, e.g. clingo-dl, comprises an optimization algorithm that supports minimization of single integer variables. The method for solving the answer set programming program described herein improves the optimization algorithm in various ways which will be described in detail below.

An exemplary ASP encoding for machine scheduling in declarative modelling language comprises:

1 {asg(J,M):cap(M,J)} 1:−job(J).
before(J1,J2,M)|before(J2,J1,M):−asg(J1,M), asg(J2,M), J1<J2.
1 {first (J,M):asg(J,M)} 1:−asg(_,M).
1 {last (J,M):asg(J,M)} 1:−asg(_,M).
1 {next(J1,J2,M):before(J1,J2,M)} 1:−asg(J2,M), not first (J2,M).
1 {next(J2,J1,M):before(J2,J1,M)} 1:−asg(J2,M), not last (J2,M).
:−first (J1,M), before(J2,J1,M).
:−last (J1,M), before(J1,J2,M).
&diff{0−c(J1)}<=−(T+D+S):−asg(J1,M), next(J3,J1,M),
setup (J3,J1,M,S), duration(J1,M,D), release(J1,M,T).
&diff{c(J2)−c(J1)}<=−(P+S):−before(J2,J1,M), next(J3, J1,M),
setup (J3,J1,M,S), duration(J1,M,P).
&diff{0−c(J1)}<=−(T+D):−asg(J1,M),
duration(J1,M,D), release(J1,M,T).
&diff{c(J2)−c(J1)}<=−P:−before(J2,J1,M), duration(J1, M,P).
&diff{c(J)−cmax}<=0:−job(J).

The ASP encoding may also comprise a specification of the machine scheduling problem instance with ASP facts.

The ASP encoding is a compact relational, in essence propositional, formalism comprising variables, e.g. J, J1,J2, J3, M, and constants, e.g. D, P, S, T, cmax. Determining the solution with the hybrid ASP solver comprises replacing the variables by constant symbols in a preprocessing step and searching for a feasible solution in the resulting set of rules in which the variables are replaced by constant symbols.

The rules are of the form i {p1, . . . , pk} j:−q1, qm, not r1, not rn.

The meaning is that if a truth value for a rule is true, then some subset S of {p1, . . . , pk} with $i \leq |s| \leq j$ has to be true as well.

A difference logic comprises difference constraints and in the example deals with timing constraints. A difference constraint is an expression of the form $u-v \leq d$, where u and v are integer variables and d is an integer constant. In contrast to unrestricted integer constraints, systems of difference constraints are solvable in polynomial time. The latter are expressed in clingo-dl using theory atoms. For example, the statement that a job j starts after its release time, e.g. 10, can be expressed as &diff{0−start(j)}<=−10. Here, 0 and start(j) are integer variables, where 0 is a special integer variable with fixed value 0; thus start(j) must be at least 10.

In the example, a rule 1 {asg(J,M): cap(M,J)} 1:−job(J) defines for any job J that this job J needs to be assigned to a machine that is able to process it.

In the example, a rule before(J1,J2,M)|before(J2,J1,M):−asg(J1,M), asg(J2,M), J1<J2 defines an ordering, i.e. either J1 before J2 on M or vice versa. This ensures a basic order.

Rules comprising &diff statements in the example comprise differences of integer values wherein in T, D, S and P indicate termination time T, duration D, start time S and pause P, and J1,J2,J3 jobs, and M a machine.

Further rules define further aspects for assigning the jobs to the machines, wherein

- first (J,M) indicates that a job J is a first job on the machine M,
- last (J,M) indicates that a job J is a last job on the machine M,
- not first (J2,M) indicates that a job J2 is not a first job on the machine M,
- before(J1,J2,M) indicates that a job J1 is to be assigned to the machine M before job J2,
- asg(_,M) indicates that any job is assigned to the machine M,
- asg(J2,M) indicates that the job J2 is assigned to the machine M,
- next(J3,J1,M) indicates that a job J3 is the next job after a job J1 on machine M,
- duration(J1,M,P) indicates a duration of a job J1 on a machine M with a pause P,
- setup (J3,J1,M,S) indicates a setup of a machine M with a job J3 and a job J1 at a start time S;
- release(J1,M,T) indicates a termination of a job J1 on a machine M with a termination time T.
- c (J) indicates a cost for a job (J) and cmax a maximum cost of an already determined solution, job (J) indicates the job.

The method for solving the answer set programming program comprises a step 202.

The step 202 comprises providing constant symbols and a set of rules for the constant symbols that comprises the constant symbols.

Step 202 may comprise providing the ASP encoding and determining the set of rules by processing the ASP encoding in a preprocessing, wherein the variables are replaced by the constant symbols to determine the set of rules.

The set of rules comprises Boolean variables and the constraint comprises a difference that depends on integer variables. The set of rules and the constraint define a non-monotonic logic.

For scheduling jobs to machines, constant symbols are provided that represent either a job or a machine. For scheduling jobs to machines, a set of rules for assigning the jobs to the machines is provided, in which the jobs and the machines are represented by their constant symbols.

Afterwards a step 204 is executed.

The step 204 comprises determining a solution to the answer set programming program that comprises at least one of the constant symbols and is defined depending on the set of rules.

For scheduling jobs to machines, a schedule is determined as the solution. In the schedule, each constant symbol that represents a job is assigned to one constant symbol that represents a machine.

To obtain a feasible solution to start with, a construction heuristic may be used to directly generate the feasible solution.

In the case of the scheduling problem that is used as an example, this heuristic may be defined as follows:

Start with an empty schedule. Until all jobs got assigned to some machine, pick an unassigned job j and a machine m, and put j as early as possible on machine m if this choice yields minimal makespan increase of the partial schedule. This algorithm runs in polynomial time and produces a feasible schedule of fairly good quality.

Determining the solution may comprises a combinatorial search and optimization on the non-monotonic logic instead. This means, the solution may be found by the hybrid ASP solver using the ASP encoding and the ASP facts.

Afterwards a step 206 is executed.

The step 206 comprises determining a constraint depending on a cost for the solution. The cost is for example determined with a cost function having a value that depends on the solution.

The constraint for the scheduling problem may be determined depending on a cost for processing the jobs according to the schedule, i.e. the makespan. The constraint may be determined to express that the cost for processing the jobs according to the redetermined schedule is less than the cost for processing the jobs according to the schedule.

Afterwards a step 208 is executed.

In the step 208, the solution is set as incumbent.

Afterwards a step 210 is executed.

In the step 210, it is determined whether a global time limit is expired or not. In case the global time limit is expired, a step 212 is executed. Otherwise a step 214 is executed.

The solution is determined iteratively by redetermining the solution. When the global time limit expired, the step 212 is executed.

The step 212 comprises outputting the latest redetermined solution. In the example the incumbent is output.

The step 214 comprises selecting in the solution at least one constant symbol.

For scheduling jobs to machines, at least one constant symbol is selected in the schedule that represents a job or a machine.

The method may comprise selecting an amount or a percentage of the constant symbols in the solution or schedule.

The amount or percentage is for example determined depending on a size of the set of rules or depending on a time limit for finding the solution with answer set programming.

The method may comprise selecting in the solution, all of the constant symbols in particular in case redetermining the solution failed.

This configures a larger neighborhood search, LNS, that is part of the method.

The amount or percentage of constant symbols in the solution or schedule that are selected, enable the LNS, i.e. to search for an improved solution with the hybrid ASP solver in a neighborhood of the previously found solution. The amount or percentage are a relaxation operator as follows.

The solutions are given as answer sets. In the example the answer sets comprise atoms that use certain predicates and the constant symbols to define the solution. In the example of scheduling jobs to machines, the atoms assign a job to a machine.

Given a fixed set of constant symbols C and a relaxation percentage r, a relaxation operation selects r percent of the constant symbols in C as set CO and marks every atom in the solution that contains a constant symbol from CO for relaxation, i.e., to be treated as variable when solving the answer set program. In the example of scheduling jobs to machines, the set C is all the jobs. Relaxing all atoms that contain a specific job helps to deal with functional dependencies between atoms that otherwise could undo the effects of the relaxation operator.

The relaxation rate is in the example adjusted depending on the problem type, size, and the global time limit.

The step 216 comprises determining a solution to an answer set programming program that comprises at least one of the constant symbols and that is defined depending on the set of rules, and the constraint.

For scheduling jobs to machines, a schedule is determined as solution, in which each constant symbol that represents a job is assigned to one constant symbol that represents a machine. This schedule is determined as the result of the answer set programming program that is defined depending on the set of rules, and the constraint.

When solving this answer set programming program, the at least one constant symbol is treated as variable in the set of rules.

The method may comprise treating all constants symbols in the set of rules as variables, in particular in case redetermining the solution failed.

This means the step 216 comprises redetermining the solution or schedule as a result of the answer set programming program that is defined depending on the set of rules, and the constraint.

Redetermining the solution comprises a combinatorial search and optimization on the non-monotonic logic.

Redetermining the solution may comprises aborting a search for the result of the answer set program when a predetermined time limit is expired. Then redetermining the solution was not successful.

The search operation is in the example realized with incremental calls to the hybrid ASP solver, e.g. clingo-dl. The relaxation of a solution is done in the example by fixing the truth value of any atom that is not marked for relaxation to true. In clingo-dl a corresponding API feature for defining assumptions may be used.

Before each call of the hybrid ASP solver, the constraint is added. The constraint in the example expresses that any new solution has a smaller value for the integer variable that shall be minimized than the best solution found so far. In the example the constraint expresses that the cost for the new solution is less than the cost of the previously best solution.

For any call of the hybrid ASP solver, the search may be aborted after the predetermined time limit. The time limit is adjusted depending on the problem type, size, and the global time limit.

Afterwards a step 218 is executed.

In the step 218, it is determined whether redetermining the solution was successful or failed. In case no solution was found, step 210 is executed. Otherwise, a step 220 is executed.

When the search is aborted or no solution is found, the method may continue with step 210 to select, while still within the global time limit, in step 214 at least one different constant symbol to be treated as variable and restarting the redetermining of the solution with the at least one different constant symbol being treated as variable in the set of rules.

In step 220, the redetermined solution is set as incumbent. Afterwards a step 222 is executed.

The step 222 comprises determining the constraint depending on a cost for the solution.

For scheduling jobs to machines, the constraint is determined depending on a cost for processing the jobs according to the schedule. The cost may be determined depending on a time for executing the jobs according to the schedule.

The constraint may be determined to express that the cost for processing the jobs according to the redetermined schedule is less than the cost for processing the jobs according to the schedule.

The constraint may be added or the previous constraint may be replaced.

What is claimed is:

1. A method for solving an answer set programming program, the method comprising:

providing constant symbols and a set of rules for the constant symbols that includes the constant symbols, wherein the answer set programming program is defined depending on the set of rules;

determining a solution to the answer set programming program that includes at least one of the constant symbols;

determining a constraint depending on a cost for the solution;

selecting in the solution at least one constant symbol;

redetermining the solution as a result of the answer set programming program that is defined depending on the set of rules, and the constraint;

wherein when solving the answer set programming program for redetermining the solution, the at least one constant symbol is treated as variable in the set of rules.

2. The method according to claim 1, wherein the set of rules includes Boolean variables and the constraint includes a difference that depends on integer variables, wherein the set of rules and the constraint define a non-monotonic logic, and wherein redetermining the solution includes a combinatorial search and optimization on the non-monotonic logic.

3. The method according to claim 1, wherein the method is used for scheduling jobs for machines, and further comprises:

receiving constant symbols that represent either a job or a machine, and a set of rules for assigning the jobs to the machines in which the jobs and the machines are represented by their constant symbols;

determining as a solution, a schedule in which each constant symbol that represents a job is assigned to one constant symbol that represents a machine;

determining the constraint depending on a cost for processing the jobs according to the schedule;

selecting in the schedule at least one constant symbol; and redetermining the schedule as a result of the answer set programming program that is defined depending on the set of rules, and the constraint;

wherein when solving the answer set programming program, the at least one constant symbol is treated as variable in the set of rules.

4. The method according to claim 3, further comprising determining the cost depending on a time for executing the jobs according to the schedule.

5. The method according to claim 3, further comprising determining the constraint to express that the cost for processing the jobs according to the redetermined schedule is less than the cost for processing the jobs according to the schedule.

6. The method according to claim 1, further comprising selecting, in the solution, an amount or a percentage of the constant symbols.

7. The method according to claim 6, wherein determining the amount or percentage depends on a size of the set of rules or depends on a time limit for finding the solution with answer set programming.

8. The method according to claim 1, further comprising:

selecting, in the solution, all of the constant symbols, or treating all constants symbols in the set of rules as variables, in case redetermining the solution fails.

9. The method according to claim 1, wherein the redetermining includes iteratively redetermining the solution and outputting a latest redetermined solution when a time limit is expired.

10. The method according to claim 1, wherein redetermining the solution includes aborting a search for the result of the answer set program when a time limit is expired, selecting at least one different constant symbol to be treated as variable and restarting the redetermining of the solution with the at least one different constant symbol being treated as variable in the set of rules.

11. A device for scheduling jobs for a machine, comprising:

at least one processor; and at least one non-transitory memory storing instructions for solving an answer set programming program, the instruction, when executed by the at least one processor, causing the at at least one processor to perform the following steps:

providing constant symbols and a set of rules for the constant symbols that includes the constant symbols, wherein the answer set programming program is defined depending on the set of rules;

determining a solution to the answer set programming program that includes at least one of the constant symbols;

determining a constraint depending on a cost for the solution;

selecting in the solution at least one constant symbol; and redetermining the solution as a result of the answer set programming program that is defined depending on the set of rules, and the constraint;

wherein when solving the answer set programming program for redetermining the solution, the at least one constant symbol is treated as variable in the set of rules.

12. A non-transitory memory medium on which is stored a computer program for solving an answer set programming program, the computer program, when executed by a computer, causing the computer to perform the following steps;

providing constant symbols and a set of rules for the constant symbols that includes the constant symbols, wherein the answer set programming program is defined depending on the set of rules;

determining a solution to the answer set programming program that includes at least one of the constant symbols;

determining a constraint depending on a cost for the solution;

selecting in the solution at least one constant symbol; and redetermining the solution as a result of the answer set programming program that is defined depending on the set of rules, and the constraint;

wherein when solving the answer set programming program for redetermining the solution, the at least one constant symbol is treated as variable in the set of rules.

* * * * *